United States Patent [19]

Komuro et al.

[11] Patent Number: 5,145,152
[45] Date of Patent: Sep. 8, 1992

[54] HIGH-VACUUM VALVES

[75] Inventors: Hiroshi Komuro; Tsuneo Ishigaki, both of Soka, Japan

[73] Assignee: SMC Corporation, Tokyo, Japan

[21] Appl. No.: 727,434

[22] Filed: Jul. 9, 1991

[51] Int. Cl.$^5$ .................................................. F16K 7/16
[52] U.S. Cl. ..................................... 251/331; 251/176
[58] Field of Search ............................... 251/331, 176

[56] References Cited

U.S. PATENT DOCUMENTS 4,953,826 9/1990 Ohmi et al. ............................ 251/331

Primary Examiner—Arnold Rosenthal
Attorney, Agent, or Firm—Oblon, Spivak, McClelland, Maier & Neustadt

[57] ABSTRACT

In a high-vacuum valve whose valve body is brought in and out of contact with a valve seat, a metal diaphragm facing the valve seat defines a valve seat, an actuating mechanism to open and close the valve body is provided on the reverse side of the diaphragm outside the valve chamber, and a spring is provided between the actuating mechanism and diaphragm in a position corresponding to the position of the valve seat. This high-vacuum valve eliminates the stagnation of gas in its passage, reduces the surface area of its passage, and precludes the detrimental effect of the powder of abraded metal.

4 Claims, 3 Drawing Sheets

HIGH-VACUUM VALVES

FIELD OF THE INVENTION

This invention relates to high-vacuum valves, and more specifically to the sealing mechanisms of high-vacuum valves.

DESCRIPTION OF THE PRIOR ART

In apparatus for manufacturing semiconductors and other similar apparatus, it is necessary to keep the pressure therein at such a high level as approximately $10^{-10}$ Torr to facilitate the supply and exchange of gases. High-vacuum valves used for this purpose are required to eject no particles, cause no stagnation of gas in fluid passages, have small surface areas and release little gas, and permit baking for degassing.

With conventional high-vacuum valves of the type described above, the valve seat 1 is sealed with a metal C-ring 2 as shown in FIG. 6. The metal C-ring 2 comprises an annular jacket 3 of metal sheet having a C-shaped cross-section, with an endless coil spring 4 of metal wire fit therein.

Even when the jacket 3 is made of such soft metals as aluminum, silver, gold and copper with low stability, the metal C-ring 2 as a whole functions like an elastic member because of the resilience of the spring 4 that restores the original condition. Thus, the spring 4 corrects the distortion in the jacket 3 that has been kept in the sealing position for a long time. The metal C-ring 2 has another advantage of being able to withstand the heat cycle of baking. But the metal C-ring 2 causes the stagnation of gas in it, more specifically in the spaces between the valve seat 1 and jacket 3, between the jacket 3 and spring 4, and inside the spring 4. In addition, the metal C-ring 2 releases a large quantity of gas because the jacket 3 and spring 4 have large surface areas. Furthermore, the compression of the metal C-ring 2 brings the jacket 3 and spring 4 and the individual rings of the spring 4 into close contact, which results in the production of a powder of abraded metal.

SUMMARY OF THE INVENTION

A principal object of this invention is to provide a high-vacuum valve having no elastic member like the metal C-ring in its fluid passage, causing no stagnation of gas inside, reducing the surface area of the fluid passage and evacuating the inside to a higher degree than conventional.

Another object of this invention is to provide a high-vacuum valve that rids of its fluid passage an elastic member like the metal C-ring, thereby eliminating the detrimental effect of the powder of abraded metal.

In a high-vacuum valve whose valve seat is sealed by taking advantage of the displacement of a diaphragm serving as its valve body, a sealing member like a metal C-ring is commonly provided on the side of the valve seat with which the valve body comes in contact. With this type of high-vacuum valve, it is necessary to close the valve seat while compressing the sealing member or to cause the valve body to over-travel by displacing the metal C-ring on the valve seat side.

Still another object of this invention is to increase the durability of the diaphragm by eliminating the excess stroke thereof by making the displacement of the diaphragm equal to the opening in the valve seat by obviating the need of providing a metal C-ring or the like on the valve seat side.

Yet another object of this invention is to provide large enough load and stability to open and close the valve seat by a simple mechanism in which the valve body is brought in contact with the valve seat by an endless annular spring made of a closely wound helical spring of metal wire.

A further object of this invention is to permit manufacturing high-vacuum valves at extremely low cost by using a plate spring in place of the endless annular spring mentioned above.

In order to achieve the above objects, high-vacuum valves according to this invention, which comprises a valve proper having multiple ports and a valve seat provided in a passage through which said ports communicate with each other, a valve body to open and close the valve seat, and an actuating mechanism to bring said valve body into and out of contact with the valve seat, is characterized in that a metal diaphragm facing said valve proper and valve seat provides a partitioned valve chamber, said actuating mechanism is disposed on the reverse side of the diaphragm and outside the valve chamber, a spring to press the diaphragm against the valve seat and absorb the over-travel of the valve body is provided between the actuating mechanism and diaphragm in a position corresponding to the position of the valve seat.

The spring mentioned above comprises an endless annular spring made by closely winding a metal wire into a helical form that is put in a position to face the valve seat. The annular spring may be placed either in direct contact with the back of the diaphragm that serves as a valve body or between a spring seat attached to the tip of the valve rod that is a member of the actuating mechanism to bring the valve body in and out of contact with the valve seat in such a manner as to slide integrally therewith and rotate relatively thereto and a spring holder kept in contact with the metal diaphragm.

The spring mentioned above may also comprises a disk-shaped plate spring whose periphery is supported by a spring holder kept in contact with the diaphragm, with the valve rod kept in contact with the center of the plate spring.

The high-vacuum valves of the structure described above are free from the stagnation of gas in the passage and the detrimental effect of the powder of abraded metal, with the surface area of the fluid passage made smaller than conventional.

Other features of this invention will become apparent from the following description of the preferred embodiments thereof.

DESCRIPTION OF THE PREFERRED EMBODIMENTS

Figure 1:
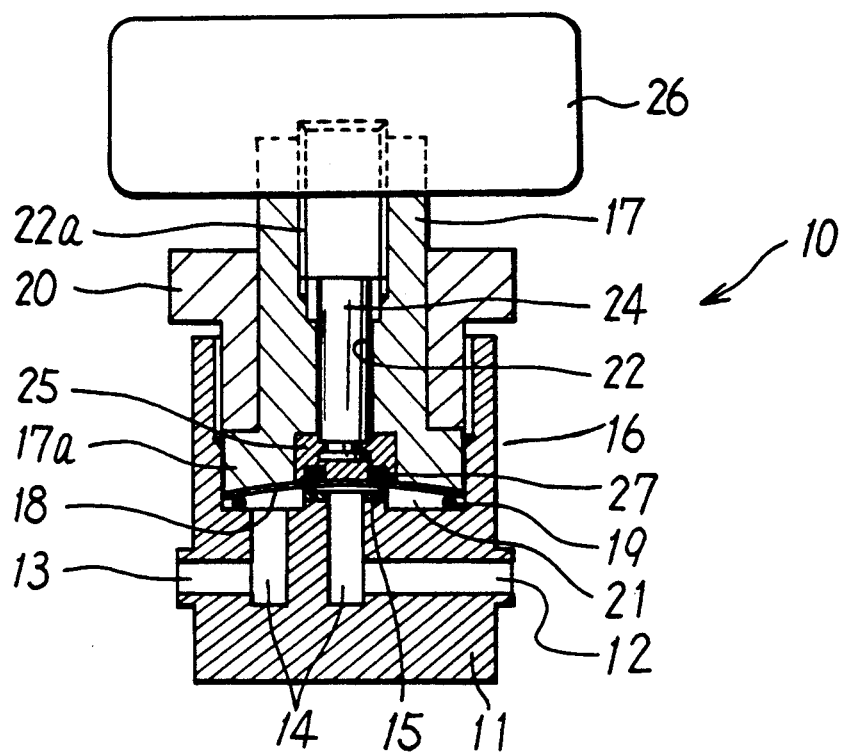
FIG. 1 is a cross-sectional front view of a first preferred embodiment of this invention.
Figure 2:
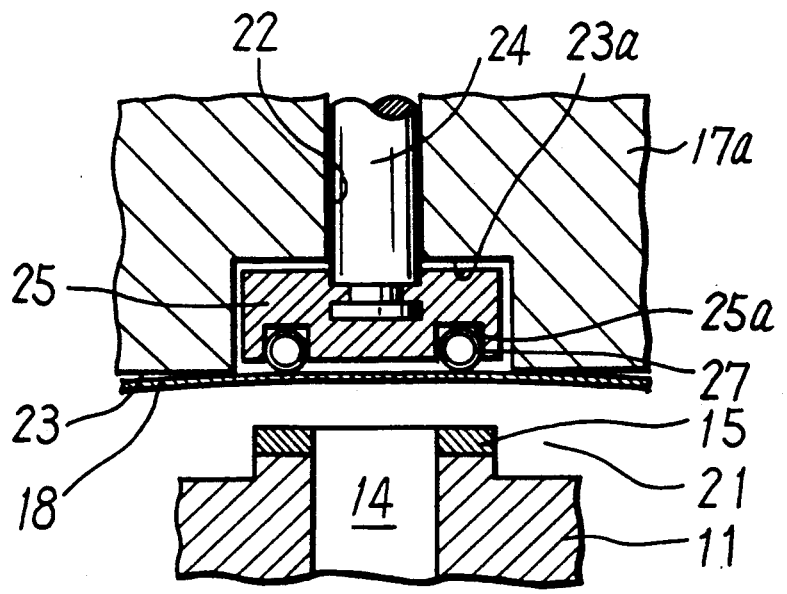
FIG. 2 is an enlarged cross-sectional view of a principal portion of the same embodiment.
Figure 3:
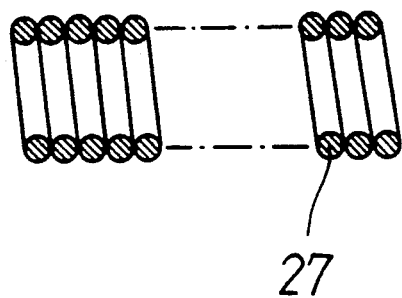
FIG. 3 is a cross-sectional view showing a part of an endless annular spring.

FIGS. 1 to 3 show a first preferred embodiment of the high-vacuum valves according to this invention. A high-vacuum valve 10 comprises a valve proper 11 that has ports 12 and 13 through which a fluid is admitted and discharged, a valve seat 15 provided in a passage 14 communicating with said two ports, and a bore 16 provided in the direction in which the opening in the valve seat 15 opens.

A bonnet 17 inserted in the bore 16 has a flange 17a at the bottom end thereof. Between the flange 17a and the bottom inner wall of the valve proper 11 is provided a metal seal 19 so as to rest between a metal diaphragm 18 that is disposed directly beneath the flange 17a so as to face the valve seat 15 and said bottom inner wall, which are all held in position by a threaded member 20 screwed in the bore 16, thereby keeping a valve chamber 21 defined by the valve proper 11 and metal diaphragm 18 hermetically sealed.

The bonnet 17 has an axially extending through hole 22 at the center thereof and a substantially concave bottom end 23 with said through hole 22 opening at the center thereof. A valve rod 24 is screwed into a threaded portion 22a of the through hole 22 in the bonnet 17, and a handle 26 is fastened to the top end of the valve rod 24 projecting outside the bonnet 17. The members just described constitute an actuating mechanism that brings the metal diaphragm 18 in and out of contact with the valve seat. To the other end of the valve rod 24 is provided a spring seat 25 that is loosely fitted in a hole 23a at the center of the concave bottom end 23 in such a manner as to reciprocate integrally therewith and rotate relatively thereto. An endless annular spring 27 is fit in a groove 25a that is provided in the bottom surface of the spring seat 25 facing the metal diaphragm 18 in such a position corresponding to the position of the valve seat 15 (see FIG. 2).

The spring 27 is an endless annular coil made by closely winding a wire of stainless steel or other metal having a circular cross section as shown in FIG. 3. When a vertical force acts in FIG. 3, as such, the spring 27 gets deformed in the direction of the diameter thereof.

In the high-vacuum valve just described, the metal diaphragm 18 comes in contact with the valve seat 15 when the handle 26 is turned to rotate the valve rod 24 to move the metal diaphragm 18 toward the valve seat 15. When the spring 27 is compressed by the further rotation of the handle 26, the diaphragm 18 hermetically seals the valve seat 15. After the diaphragm 18 has come in contact with the valve seat 15, the compression of the spring 27 absorbs the over-travel of the valve rod 24 and spring seat 25.

Provision of the spring 27 to absorb the over-travel of the valve rod 24 etc. on the reverse side of the diaphragm 18 away from the valve seat 15 or outside the valve chamber 21 partitioned by the diaphragm 18 eliminates the stagnation of gas in the passage 14, reduces the surface area of the portion constituting the passage 14, provides a higher degree of vacuum, and avoids the detrimental effect of the powder of abraded metal.

The endless annular spring 27 applies a proper amount of compressive force and force to restore the original condition to the metal seal. Even when the valve seat 15 is not flat enough to provide an undulation-free seal surface, effective sealing is secured because the spring 27 whose amount of deformation varies at different parts thereof always keeps the diaphragm 18 in uniform contact with the valve seat 15.

Though not shown, a convex sealing surface facing the valve seat 15 may be provided on the reverse side of the diaphragm 18 away from the spring 27 so that the diaphragm 18 is pressed against the valve seat 15 with a greater force to ensure more effective sealing.

Figure 4:
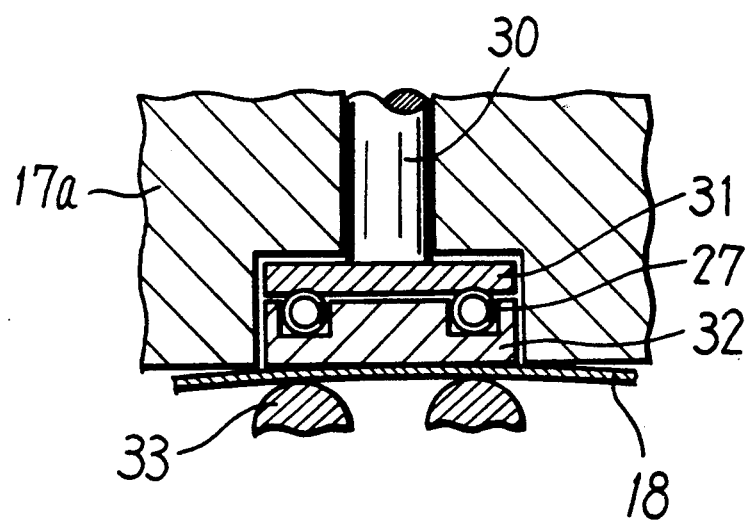
FIG. 4 is an enlarged cross-sectional view showing a principal portion of a modification of the first preferred embodiment.

FIG. 4 shows a modification of the first preferred embodiment, in which the endless annular spring 27 is inserted between a spring seat 31, which is fit in the flange 17a at the bottom end of the bonnet in such a manner as to slide integrally with and rotate relatively to a valve rod 30, and spring holder 32 that comes in contact with the metal diaphragm 18. With this modified embodiment, the valve seat 15 may have an arched surface as shown by reference numeral 33 because the metal diaphragm 18 is pressed thereagainst through the spring holder 32.

Here detailed description of other members is omitted because they are similar to those in the first preferred embodiment shown in FIGS. 1 to 3.

Figure 5:
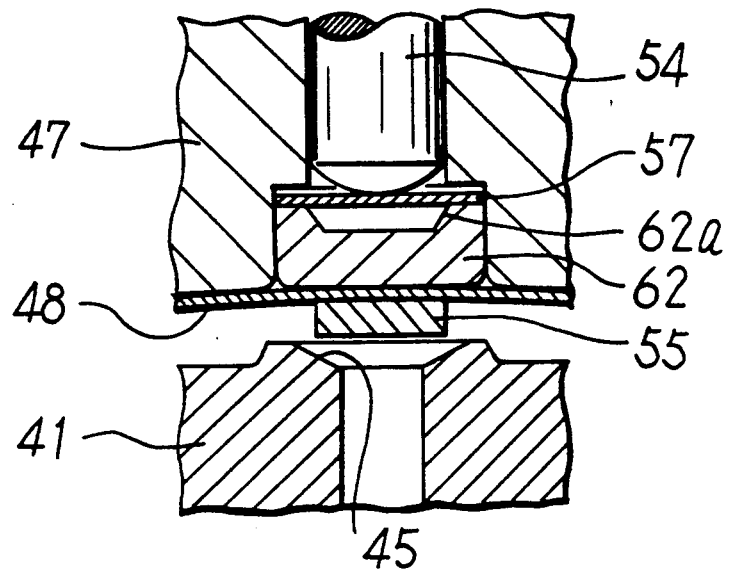
FIG. 5 is an enlarged cross-sectional view showing a principal portion of a second preferred embodiment of this invention.
Figure 6:
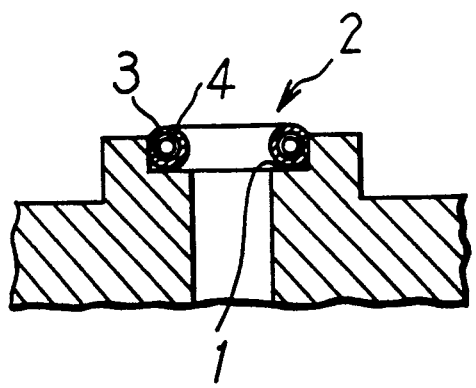
FIG. 6 is an enlarged cross-sectional view of a known sealing mechanism.

FIG. 5 shows a second preferred embodiment of this invention. Though not shown, the entire valve structure of this embodiment is essentially similar to the one shown in FIG. 1. A valve proper 41 corresponds to the valve proper 11 in FIG. 1, a valve rod 54 corresponds to the valve rod 24, and a bonnet 47 corresponds to the bonnet 17. A disk-shaped plate spring 57 is provided between the valve rod 54 and a spring holder 62. The spring holder 62 having a recess 62a supports the periphery of the plate spring 57 which causes the valve rod 54 to over-travel by bending as the valve rod 54 contacting the center thereof changes its position. To that side of the metal diaphragm 48 which faces the valve seat 45 is attached a valve member 55 of such soft metal as copper, nickel and aluminum. Other parts of the second preferred embodiment are similar to those of the first preferred embodiment.

The extremely low cost of the second preferred embodiment is due to the use of the plate spring 57.

What is claimed is:

1. In a high-vacuum valve comprising a valve proper having a plurality of ports and a valve seat disposed in a passage communicating therewith, a valve body to open and close the valve seat, and an actuating mechanism to bring the valve body in and out of contact with the valve seat, the improvement which comprises:

a valve chamber defined by the valve proper and a metal diaphragm facing the valve seat therein, the actuating mechanism being disposed on the reverse side of the metal diaphragm and outside the valve chamber; and a spring to apply a force to press the metal diaphragm against the valve seat and absorb an over-travel disposed in a position corresponding to the position of the valve seat between the actuating mechanism and metal diaphragm, wherein the spring comprises an endless annular coil spring made by closely winding a metal wire into a helical form and disposed in a position corresponding to the position of the valve seat.

2. The improvement according to claim 1, in which a diaphragm serves as the valve body and an annular spring is kept in direct contact with the reverse side thereof.

3. The improvement according to claim 1, in which an annular spring is inserted between a spring seat attached to the tip of a valve rod constituting an actuating mechanism to bring the valve body in and out of contact with the valve seat in such a manner as to slide integrally therewith and rotate relatively thereto and a spring holder kept in contact with the metal diaphragm.

4. A high-vacuum valve comprising:

a valve proper having a plurality of ports through which a fluid is admitted and discharged, a valve seat disposed in a passage communicating with the plurality of ports and a bore provided in the direction in which the opening in the valve seat opens, and a bonnet inserted in said bore;

a metal seal disposed and fastened between the bonnet and the inner bottom wall of the valve proper so as to rest between a metal diaphragm that is disposed directly beneath the bonnet so as to face the valve seat and said bottom inner wall, thereby keeping a valve chamber hermetically sealed; and a valve rod screwed into a threaded portion of a through hole at the center of the bonnet so as to permit operation from outside, with a spring seat loosely fit in the bonnet and attached to the bottom end of the valve rod so as to reciprocate integrally therewith and rotate relatively thereto and an annular spring inserted in a groove cut in the spring seat so as to correspond to the position of the valve seat.

* * * * *